United States Patent
Lisart et al.

(10) Patent No.: US 10,833,027 B2
(45) Date of Patent: Nov. 10, 2020

(54) INTEGRATED PHYSICALLY UNCLONABLE FUNCTION DEVICE WITH A SET OF TRANSISTORS EXHIBITING A RANDOM DISTRIBUTION OF THRESHOLD VOLTAGES

(71) Applicants: STMicroelectronics (Crolles 2) SAS, Crolles (FR); STMicroelectronics (Rousset) SAS, Rousset (FR)

(72) Inventors: Mathieu Lisart, Aix en Provence (FR); Raul Andres Bianchi, Myans (FR); Benoit Froment, Grenoble (FR)

(73) Assignees: STMICROELECTRONICS (CROLLES 2) SAS, Crolles (FR); STMICROELECTRONICS (ROUSSET) SAS, Rousset (FR)

( * ) Notice: Subject to any disclaimer, the term of this patent is extended or adjusted under 35 U.S.C. 154(b) by 369 days.

(21) Appl. No.: 15/784,883

(22) Filed: Oct. 16, 2017

(65) Prior Publication Data
US 2018/0277496 A1 Sep. 27, 2018

(30) Foreign Application Priority Data
Mar. 22, 2017 (FR) ...................................... 17 52336

(51) Int. Cl.
*G01L 23/00* (2006.01)
*H01L 23/00* (2006.01)
(Continued)

(52) U.S. Cl.
CPC .......... *H01L 23/576* (2013.01); *G06F 9/4403* (2013.01); *H01L 21/266* (2013.01);
(Continued)

(58) Field of Classification Search
CPC ... H01L 23/576; H01L 27/088; H01L 23/528; H01L 21/823475; H01L 21/32055;
(Continued)

(56) References Cited

U.S. PATENT DOCUMENTS

2011/0317829 A1  12/2011  Ficke et al.
2013/0322617 A1  12/2013  Orshansky

OTHER PUBLICATIONS

Che, Wenjie et al., "A Non-Volatile Memory Based Physically Unclonable Function without Helper Data," IEEE Computer-Aided Design, pp. 148-153, Nov. 3, 2014.

*Primary Examiner* — Selim U Ahmed
(74) *Attorney, Agent, or Firm* — Slater Matsil, LLP

(57) ABSTRACT

An integrated device for physically unclonable functions is based on a set of MOS transistors exhibiting a random distribution of threshold voltages which are obtained by lateral implantations of dopants exhibiting non-predictable characteristics, resulting from implantations through a polysilicon layer. A certain number of these transistors form a group of gauge transistors which makes it possible to define a mean gate source voltage making it possible to bias the gates of certain others of these transistors (which are used to define the various bits of the unique code generated by the function). All these transistors consequently exhibit a random distribution of drain-source currents and a comparison of each drain-source current of a transistor associated with a bit of the digital code with a reference current corresponding to the average of this distribution makes it possible to define the logical value 0 or 1 of this bit.

24 Claims, 15 Drawing Sheets

(51) Int. Cl.
    *H04L 9/32*     (2006.01)
    *H04L 9/00*     (2006.01)
    *G06F 9/4401*     (2018.01)
    *H01L 21/265*     (2006.01)
    *H01L 21/266*     (2006.01)
    *H01L 21/3205*     (2006.01)
    *H01L 21/8234*     (2006.01)
    *H01L 23/528*     (2006.01)
    *H01L 27/088*     (2006.01)
    *H03K 17/14*     (2006.01)

(52) U.S. Cl.
    CPC .. *H01L 21/26513* (2013.01); *H01L 21/32055* (2013.01); *H01L 21/823475* (2013.01); *H01L 23/528* (2013.01); *H01L 27/088* (2013.01); *H03K 17/145* (2013.01); *H04L 9/004* (2013.01); *H04L 9/3278* (2013.01); *H01L 21/823412* (2013.01); *H01L 21/823418* (2013.01); *H04L 2209/122* (2013.01)

(58) Field of Classification Search
    CPC ............. H01L 21/266; H01L 21/26513; H01L 21/823418; H01L 21/823412; H01L 23/57; H01L 21/8234; H04L 9/004; H04L 9/3278; H04L 2209/122; H03K 17/145; G06F 9/4403
    See application file for complete search history.

INTEGRATED PHYSICALLY UNCLONABLE FUNCTION DEVICE WITH A SET OF TRANSISTORS EXHIBITING A RANDOM DISTRIBUTION OF THRESHOLD VOLTAGES

CROSS-REFERENCE TO RELATED APPLICATIONS

This application claims priority to French Application No. 1752336, filed on Mar. 22, 2017, which application is hereby incorporated herein by reference.

TECHNICAL FIELD

This disclosure generally relates to physically unclonable functions, and in particular embodiments, to integrated physically unclonable function devices and a method of production thereof.

BACKGROUND

A physically unclonable function makes it possible to automatically generate a non-predictable unique code which depends on random or partially random physical characteristics of the physically unclonable function. These physical characteristics can be caused by variations during fabrication of the physically clonable function.

Thus, it is very difficult or indeed impossible to clone such a function.

Moreover, the content of the code generated, which, being different from one physically unclonable function to another physically unclonable function, is unique, cannot be foreseen and may depend for example on a particular configuration of components when powering up the function. Thus, for example, a physically unclonable function can be achieved through a nonvolatile memory which exhibits a content during power-up which depends on the partially random physical characteristics of the memory, these variations in fabrication leading to different physical characteristics for various memories.

At present, physically unclonable functions can be achieved with the aid for example of random-access or nonvolatile memories, or else of ring oscillators or else of specific logic circuits.

However, these devices of the prior art may in certain cases be more or less easily detectable within the integrated circuit or else not be very robust in relation to modifications of temperature or of aging or else be sensitive to fault injection attacks.

A need therefore exists to propose a physically unclonable function structure which is difficult to detect while being sufficiently robust in relation to temperature variations or aging variations and simple to embody with existing CMOS technologies.

SUMMARY

According to an embodiment, there is proposed an integrated device for physically unclonable functions which is based on a set of MOS transistors exhibiting a random distribution of threshold voltages that are obtained by lateral implantations of dopants exhibiting non-predictable characteristics, resulting, for example from, implantations through a polysilicon layer. A certain number of these transistors are then used as a group of "gauge" transistors which make it possible to define a mean (i.e., average) gate source voltage making it possible to bias the gates of certain others of these transistors (which defines the various bits of the unique code generated by the function). All these transistors consequently exhibit a random distribution of drain-source currents and comparison of each drain-source current of a transistor associated with a bit of the digital code with a reference current corresponding to the average of this distribution, makes it possible to define the logical value 0 or 1 of this bit.

Thus, according to one embodiment, there is proposed an integrated circuit including at least one domain including a physically unclonable function device.

This physically unclonable function device includes a set of MOS transistors exhibiting a random distribution of respective threshold voltages; a first coupling link coupling a group of N first transistors of the set and at least one second transistor of the set via at least one common node; and a second coupling link between each common node and a corresponding output node of the said function.

The group of N first transistors forms a group of "gauge" transistors which make it possible to define a mean gate source voltage making it possible to bias each second transistor of the said set.

Each second transistor is associated with an output signal whose value makes it possible to define a logical value of a bit of a unique digital code delivered by the physically unclonable function, for example during the power-up of the said domain of the integrated circuit.

The embodiments apply perfectly with a single second transistor; however, generally, the number of second transistors is higher since it defines the number of bits of the code delivered by the function. And when this code is advantageously used as key, it is preferable that this number of bits be big, at least greater than 10, for example 32 or 64.

Likewise, so as to obtain a good definition of the mean gate source voltage which biases the gates of the second transistors, it is preferable that the number N be sufficiently large.

It is possible to choose a number N preferably greater than or equal to 10, this number N being able however to be much greater, for example of the order of 100, without this value being limiting.

Likewise, it is possible but not necessary, that the number N of first transistors be equal to the number of second transistors.

The first coupling link is configured to take at least one first state in which they are able, when the domain is powered: to generate a principal current and to distribute the principal current in the N first transistors so as to generate for each first transistor a first mean gate source voltage; to bias the gate of each second transistor by the first mean gate source voltage; and to deliver to each common node a reference current equal to a base current corresponding to 1/Nth of the principal current.

Moreover, the second coupling link is configured to deliver to each output node an output signal whose level depends on a comparison between the level of the reference current and the level of the current passing through the corresponding second transistor.

At each power-up, the level of the current passing through each second transistor is identical.

Although it is possible to place the first coupling link in its first state right from the first power-up, it is however preferable and particularly advantageous not to place the first coupling link in its first state immediately during the first power-up.

Indeed, it is entirely possible in certain cases, that the current passing through a second transistor be very close to the reference current possibly then leading to instability in the comparison.

Hence, it is preferable during the first power-up of the physically unclonable function to detect these unstable bits so as to be able to take a decision as regards their logical value.

This is the reason why it is preferable, during the first power-up, to place firstly the first coupling link in a state in which either the principal current (second state) is shifted or the reference current (third state) is shifted, in one direction or the other.

From a hardware production point of view, it is preferable that it be the principal current which is shifted.

Thus, according to one embodiment, the first coupling link is configurable and capable furthermore of taking on command a second state in which they are able, when the domain is powered: to successively generate a first superposed current resulting from a superposition of the principal current and of an auxiliary current and then a second superposed current resulting from a superposition of the principal current and of the opposite auxiliary current, or the second current and then the first current; to successively distribute each of the currents superposed in the N first transistors so as to generate for each first transistor a corresponding second mean gate source voltage; to bias the gate of each second transistor by the said corresponding second mean gate source voltage; and to deliver to each common node the said reference current equal to the said base current.

That said, it would also be possible to shift the reference current.

Thus, according to another possible embodiment, the first coupling link is configurable and capable furthermore of taking on command a third state in which they are able, when the said domain is powered: to generate the said principal current; to distribute the principal current in the N first transistors so as to generate for each first transistor the said first mean gate source voltage; to bias the gate of each second transistor by the said first mean gate source voltage; and to successively deliver to each common node as reference current a first current resulting from a superposition of the base current and of the auxiliary current and then a second current resulting from a superposition of the said base current and of the opposite auxiliary current, or the second current and then the first current.

Whatever embodiment is chosen, the device advantageously includes a control circuit configured to place the first coupling link in its second or third state and a processor configured to analyze at the level of each output node the value of the output signal associated with the said auxiliary current and the value of the output signal associated with the opposite auxiliary current, and in case of disagreement between the two logical values of the corresponding bit of the digital code that are respectively associated with these two output signal values, take a decision as regards the management of the corresponding bit of the digital code.

The control circuit is advantageously configured to place the first coupling link in its second or third state during the first power-up of the said domain and to place the first coupling link in its first state subsequent to their placement in their second or their third state and during any later power-up.

The said decision taken during the first power-up is then valid for the whole of the rest of the first power-up and for any later power-up.

And, this decision can be taken by the processor from among the following decisions or a combination of the following decisions: a disregarding of the corresponding bit in the digital code or a fixing of an arbitrary logical value for this bit.

In practice, the first coupling link can include a controllable auxiliary current source configured to generate the auxiliary current or the opposite auxiliary current.

Moreover, the first coupling link is configured to mount each first transistor according to a diode arrangement, connect all the first transistors in parallel and connect the gates of the first transistors to the gate of each second transistor.

Moreover, the first coupling link includes in its first state a current-divider circuit connected between the gates of the first transistors and each common node.

The current-divider circuit can include a current mirror connected between the N first transistors and each common node.

That said, as a variant, it is advantageous, in particular in order to reduce current consumption, that the current-divider circuit includes a principal transistor connected to the gates of the first transistors and intended to impose the said principal current and to be biased on its gate by a bias voltage, as well as a secondary transistor connected to each common node, whose gate is connected to the gate of the principal transistor and configured to provide the said base current, equal to a 1/Nth of the principal current, to the corresponding common node.

The controllable auxiliary current source can then preferably be coupled to the gates of the first transistors and therefore to the drain of the principal transistor.

According to one embodiment, which is a consequence of an exemplary method for producing the physically unclonable function device, the said domain includes at least one additional transistor alongside each MOS transistor of the said set whose channel region includes dopants of the same type of conductivity as the dopants of the source region and drain region of the said at least one additional transistor.

In fact, this additional transistor has a gate which results from the etching of a solid-wafer polysilicon layer through which a dopant implantation has been carried out and which has made it possible to obtain a variability of the threshold voltage of the MOS transistors of the said set.

And, therefore, this additional transistor is generally on the whole time.

Moreover, it advantageously contributes to a non-detectability of the physically unclonable function since viewed from above, it is not possible to know whether this transistor is a normal transistor or an always-on transistor for example.

So as to widen the random distribution of the threshold voltages, it is preferable that each MOS transistor of the said set be flanked by two additional transistors.

According to another aspect, there is proposed a method for producing a physically unclonable function device within a domain of an integrated circuit, including a producing within the said domain of a set of MOS transistors exhibiting a random distribution of respective threshold voltages; a first coupling of a group of N first transistors of the said set and of at least one second transistor of the said set via at least one common node; a second coupling between each common node and a corresponding output node of the said device. The first coupling is configured to, when the said domain is powered, generate a principal current and optionally an auxiliary current or the opposite auxiliary current, distribute the principal current or the principal current superposed with the auxiliary current or with the opposite auxiliary current in the N first transistors so as to generate for each first transistor a corresponding mean gate source voltage, to bias the gate of each second transistor by the said corresponding mean gate source voltage, and deliver to each common node a reference current equal to a base current corresponding to 1/Nth of the principal current or to the base current superposed with the auxiliary current or with the opposite auxiliary current. The second coupling is configured to deliver to each output node an output signal whose level depends on a comparison between the level of the reference current and the level of the current passing through the corresponding second principal transistor.

According to one mode of implementation, the first coupling includes an arranging of each first transistor in diode fashion, an arranging of all the first transistors in parallel, a connecting of the gates of the first transistors to the gate of each second transistor and a producing of a current-divider circuit connected between the gates of the first transistors and each common node.

According to a variant, the producing of the current-divider circuit includes a producing of a current mirror connected between the N first transistors and each common node.

According to another variant, advantageous in terms of consumption, the producing of the current-divider circuit includes a producing of a principal transistor connected to the gates of the first transistors and intended to impose the said principal current and to be biased on its gate by a bias voltage, and a secondary transistor connected to each common node, whose gate is connected to the gate of the principal transistor and configured to provide the said base current, equal to 1/Nth of the principal current, to the corresponding common node.

According to one mode of implementation, advantageously allowing the obtaining of the random distribution of threshold voltages, the producing of the said set of MOS transistors includes: a forming above a substrate of the integrated circuit of a polysilicon layer; a forming on the said polysilicon layer of a mask including openings; an initial implantation in the substrate through the said openings and the uncovered parts of the polysilicon layer, of dopants having the same type of conductivity as the source region and drain region of the set of the said MOS transistors so as to produce initial implanted regions overhanging on each side of the said uncovered polysilicon parts; and a withdrawing of the mask and a forming of the said MOS transistors alongside the said uncovered polysilicon parts so that each first or second MOS transistor has in the substrate an active zone incorporating at least one part of an initial implanted region.

According to a preferential mode of implementation, each first or second MOS transistor is flanked by two uncovered polysilicon parts so that each first or second MOS transistor has in the substrate an active zone incorporating on each side at least one part of an initial implanted region.

According to one mode of implementation, the integrated circuit incorporating the said physically unclonable function device is produced within a semiconductor wafer simultaneously with other integrated circuits, the said polysilicon layer as well as the said mask are formed above the substrate of the whole wafer and the said initial implantation of dopants is performed solid-wafer.

This solid-wafer implantation therefore makes it possible to obtain a variability of implantation at the level of all the transistors which are intended to be produced alongside the openings of the mask, thereby making it possible, after dicing of the wafer so as to produce individual integrated circuits, to obtain integrated circuits exhibiting physically unclonable functions delivering a unique and different digital code for each integrated circuit.

According to another aspect, there is proposed a method for automatically generating a non-predictable unique code at each output node of a physically unclonable function device belonging to an integrated circuit such as defined hereinabove or achieved in accordance with the method defined hereinabove, this automatic generating method including at least one power-up of the domain of the integrated circuit incorporating the said physically unclonable function device.

According to one mode of implementation, it is possible to apply a bias voltage to the gate of the principal transistor of the current-divider circuit and to the gate of each secondary transistor, thereby making it possible in particular to limit the consumption of current.

This makes it possible in particular also to produce a mean gate source voltage close to the threshold voltage of the first and second MOS transistors, thereby making it possible to amplify the impact on the dispersion in current resulting from the dispersion in threshold voltage.

According to one mode of implementation, the automatic generating method furthermore includes, during the first power-up of the domain of the integrated circuit incorporating the physically unclonable function device, a first superposition with the said principal current of an auxiliary current and a second superposition with the said principal current of the opposite auxiliary current, an analysis of the value of the output signal delivered by each output node during the first superposition and an analysis of the value of the output signal delivered by each output node during the second superposition, and in case of disagreement between the two logical values of the corresponding bit of the digital code that are respectively associated with these two output signal values, a decision taking as regards the management of the said bit, decision valid for the rest of the first power-up and for any later power-up.

This decision taking can include a disregarding of the corresponding bit in the digital code or a fixing of an arbitrary logical value for this bit or a combination of these two decisions.

BRIEF DESCRIPTION OF THE DRAWINGS

Other advantages and characteristics of the disclosure will become apparent on examining the detailed description of wholly non-limiting modes of implementation and embodiments, and the appended drawings in which.

DETAILED DESCRIPTION OF ILLUSTRATIVE EMBODIMENTS

Figure 1:
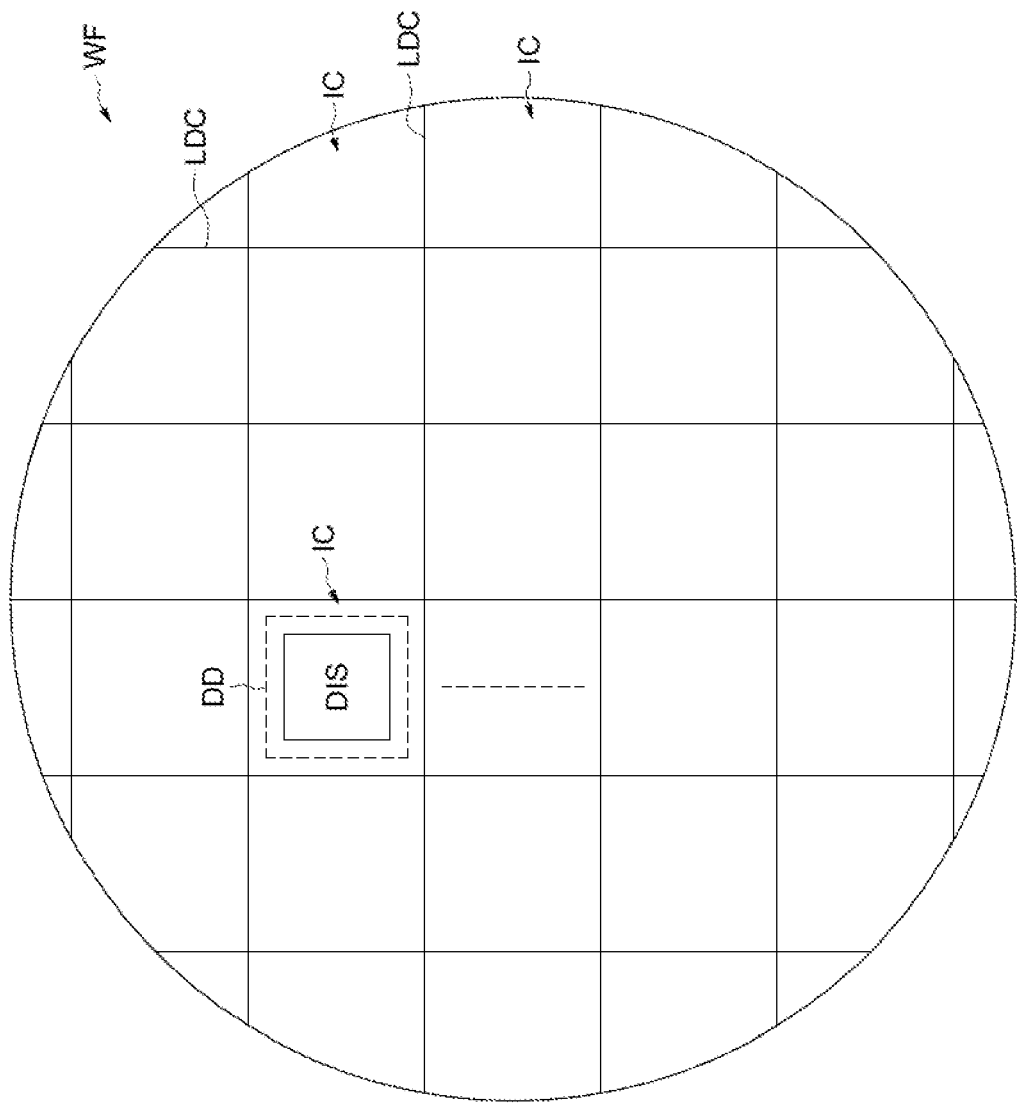
FIGS. 1 to 19 schematically illustrate various aspects, modes of implementation and embodiments.

In FIG. 1, the reference WF designates a semiconductor wafer exhibiting in a conventional and known manner dicing lines LDC for the zones of the wafer each containing an integrated circuit IC.

This integrated circuit IC here contains a domain DD incorporating a physically unclonable function device DIS.

The substrate in and on which the various devices DIS are produced can be a sturdy substrate or else a substrate of the Silicon On Insulator (SOI) type.

Moreover, the device DIS is produced here in a 45 nanometer CMOS technology, although this example is wholly non-limiting.

Figure 2:
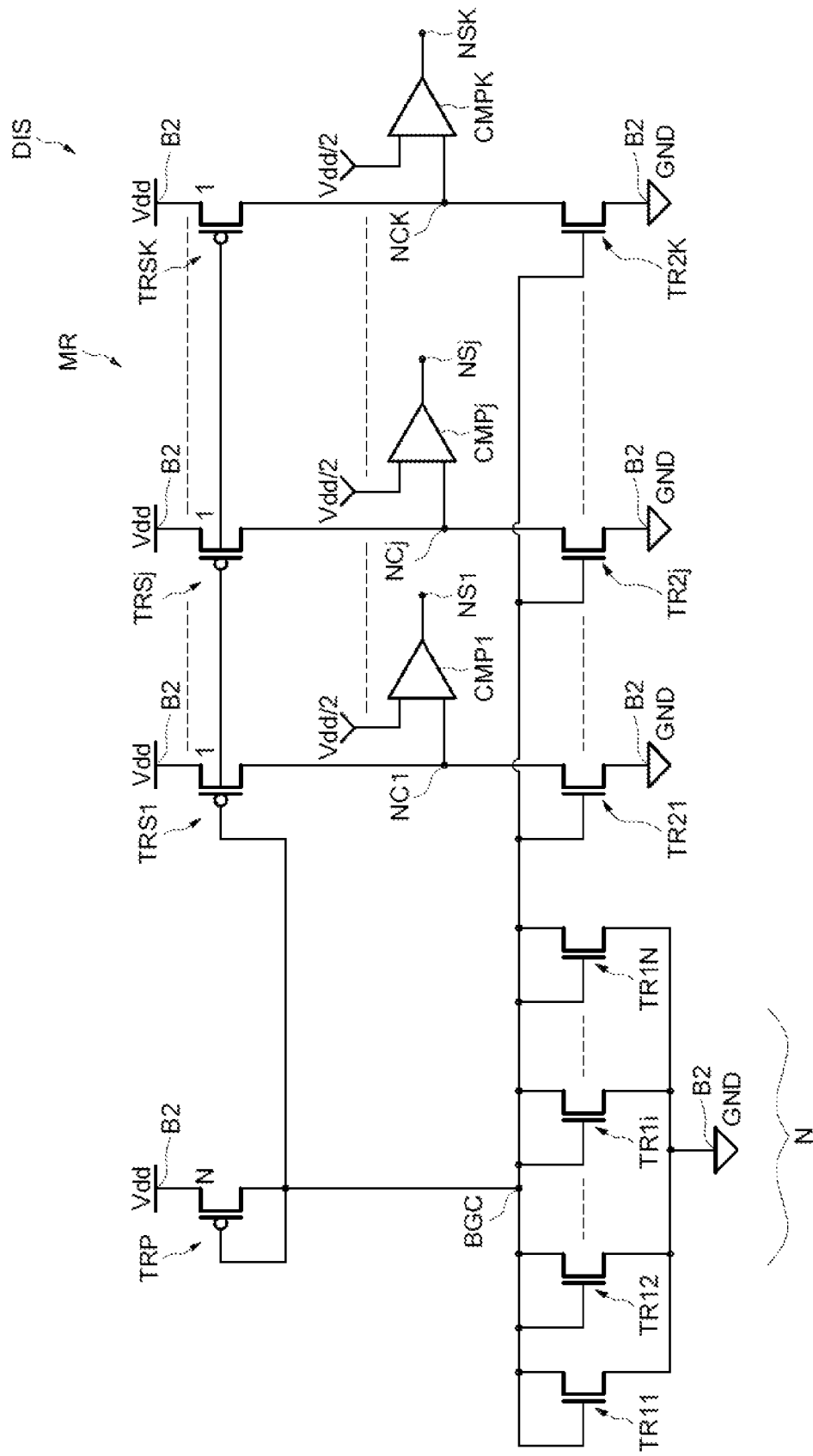

FIG. 2 schematically illustrates a possible embodiment of a physically unclonable function device DIS.

This device DIS includes a set of MOS transistors TR1$i$, TR2$j$ exhibiting a random distribution of respective threshold voltage.

This set of MOS transistors includes a group of N first transistors TR11-TR1N and in this example, K second transistors TR21-TR2K which, as will be seen in greater detail hereinafter, make it possible to define the logical values of K bits of a code generated as output of the physically unclonable function device DIS.

Figure 3:
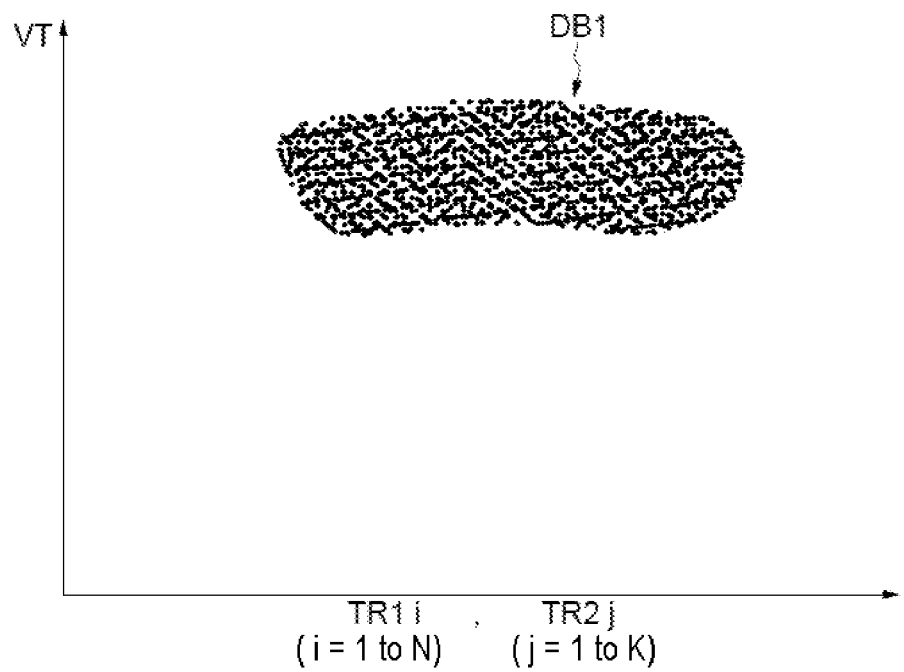
Figure 4:
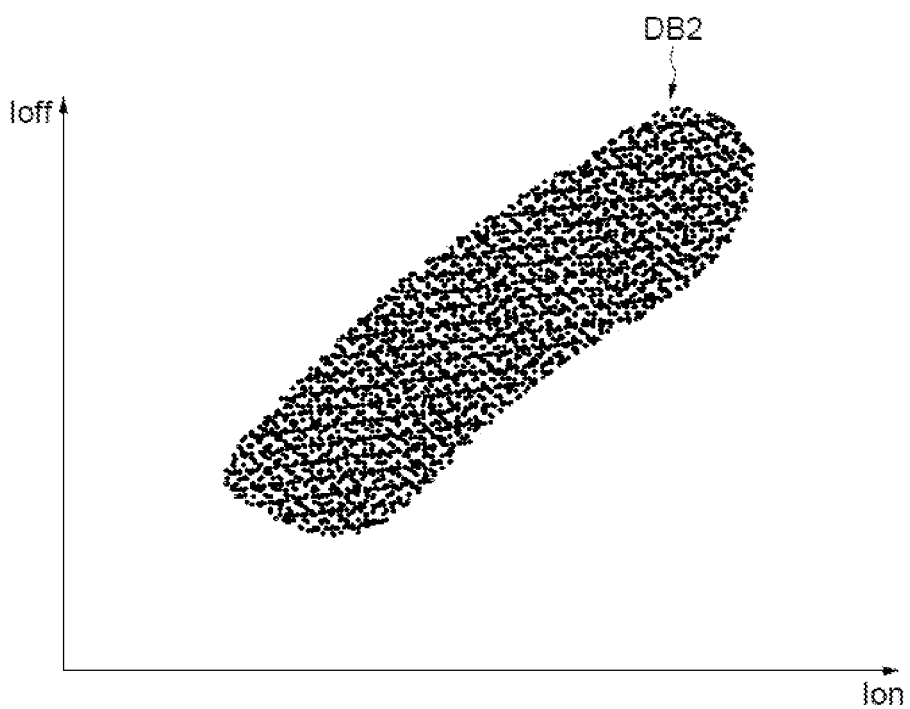

The random distribution DB1 of threshold voltage VT is illustrated very schematically in FIG. 3 and can manifest itself in particular, as illustrated in FIG. 4, by a random distribution DB2 of the ratio Ion/Ioff between the current Ion of the transistor in the on state and the current Ioff of the transistor in the off state.

An exemplary method for obtaining a random distribution such as this will be described in greater detail hereinafter.

By way of indication, in the example described here, the values of the Ion currents of the various transistors TR1$i$ and TR2$j$ vary around an average value of 631 microamperes per micrometer with a deviation of about 41%.

Of course, this is merely an example, and the embodiments described herein are compatible with any random distribution of values, whatever the spread of this distribution.

Returning now to FIG. 1, it is seen that each first transistor TR1$i$ (i varying from 1 to N) is an nMOS transistor mounted according to a diode arrangement, that is to say whose gate is linked to the drain, by, for example a metallization.

All the first transistors TR1$i$ are connected in parallel between a common terminal BGC and a reference power supply terminal B2 intended to receive a reference power supply voltage, for example the ground GND.

The group of first transistors TR1$i$ is coupled to the second transistors TR2$j$ (j=1 to K) by a first coupling link and common nodes NC$j$ (j varying from 1 to K).

Stated otherwise, there are as many common nodes as there are second transistors TR2$j$.

Here the first coupling link includes links, for example by metallizations, connecting the common terminal BGC to the gates of the K second transistors TR2$j$.

Each second transistor TR2$j$ is moreover coupled between the terminal B2 and the corresponding common node NC$j$.

Here the first coupling link also includes a current mirror MR connected between the common terminal BGC and each of the common nodes NC$j$.

The current mirror MR here includes a pMOS principal transistor referenced TRP whose source is connected to a power supply terminal B1 intended to receive a power supply voltage Vdd. This principal transistor TRP is mounted diode-fashion with its gate linked to its drain.

The drain of the transistor TRP is connected to the common terminal BGC.

The current mirror MR also includes K secondary transistors TRS1-TRSK each connected between the power supply terminal B1 and the corresponding common node NC$j$.

The gates of the secondary transistors TRS$j$ are connected to the gate and to the drain of the principal transistor TRP.

The ratio between the size of the principal transistor TRP and the size of each secondary transistor TRS$j$ is equal to N, that is to say to the number of first transistors TR1$i$.

In practice, this size ratio can be obtained by a size of the transistor TRP actually N times as big as the size of a secondary transistor TRS$j$ or else by for example N principal transistors of size 1 connected in parallel.

The device DIS moreover includes a second coupling link between each common node NC$j$ and a corresponding output node NS$j$ of the said device DIS.

These second coupling link includes, in this example, a comparator CMP$j$, between each common node NC$j$ and each output node NS$j$, a first input of which is connected to the common node NC$j$, a second input of which is intended to receive a reference voltage equal to half the power supply voltage Vdd and whose output is linked to the output node NS$j$.

As will be seen in greater detail hereinafter, each output node delivers an output signal whose level depends on the comparison between the level of a reference current delivered by the corresponding secondary transistor TRS$j$ and the level of the current passing through the corresponding second transistor TR2$j$.

And, it is possible to associate with each output signal a bit whose logical value depends on the level of the output signal.

The whole set of these bits then form a unique code delivered by the device DIS.

Figure 5:
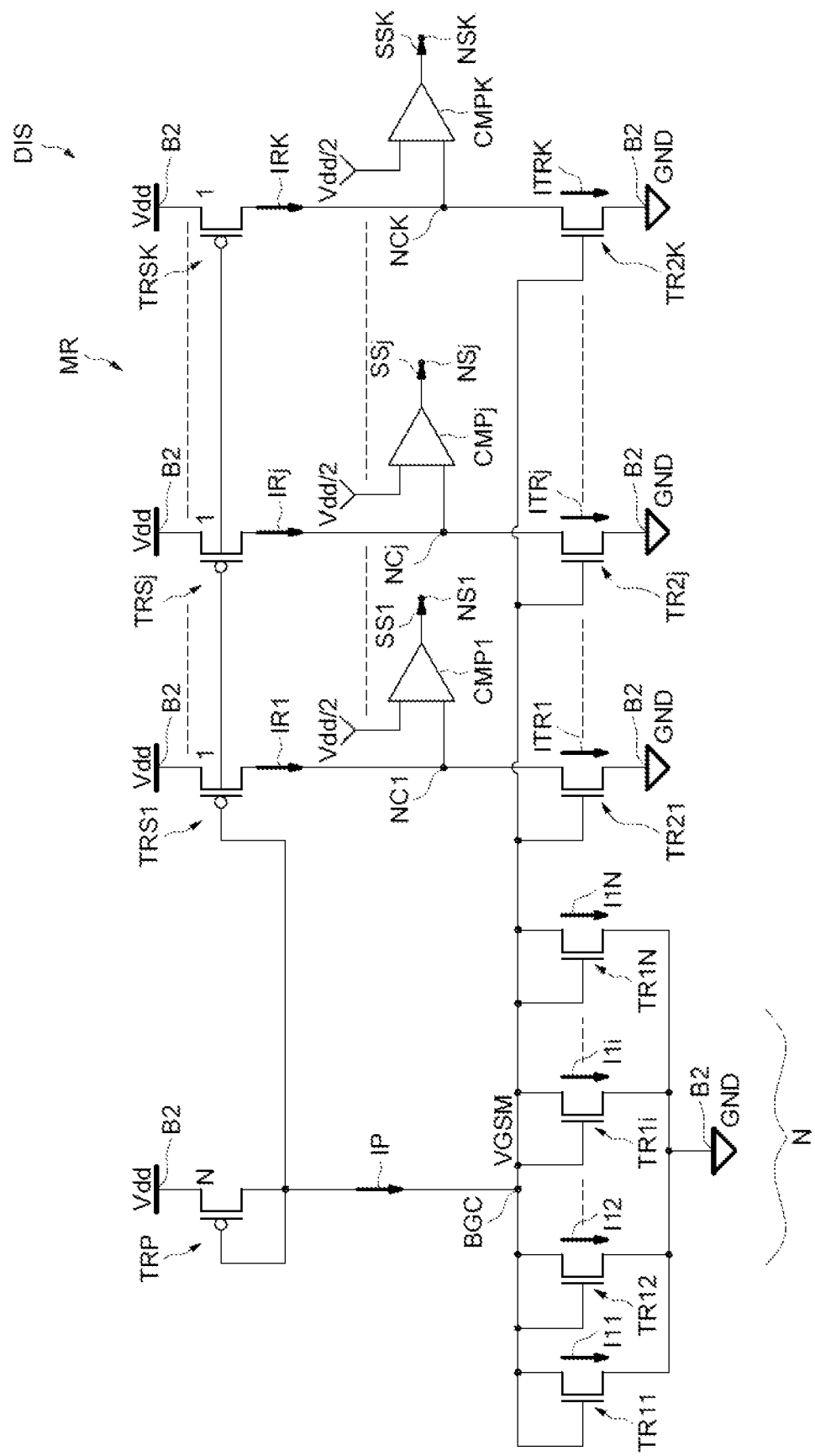
Figure 6:
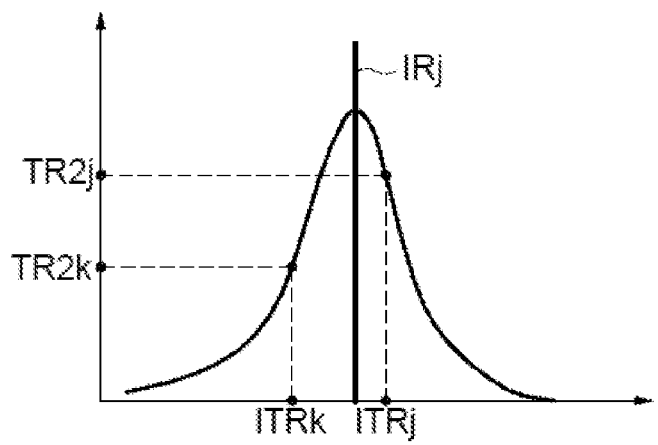
Figure 7:
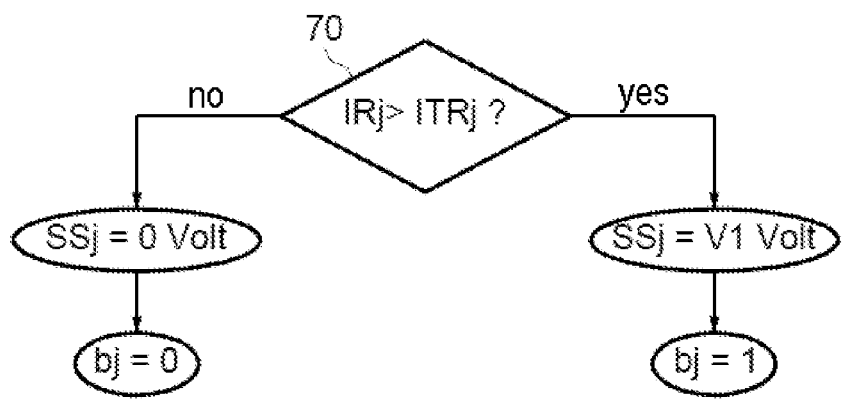

Reference is now made more particularly to FIGS. 5 to 7 to illustrate the operation of the device of FIG. 2 corresponding to an example of generation of the unique code by the device DIS.

Referring more particularly to FIG. 5, it is seen that when the domain DD of the integrated circuit including the device DIS is powered by the power supply voltage Vdd, the principal transistor TRP generates a principal current IP which is distributed in the N first transistors TR11-TR1N.

Each first transistor TR1$i$ is therefore traversed by a current I$ii$.

If all the transistors TTR1$i$ were identical, these currents I$ii$ would be identical. However, as these transistors exhibit a random distribution of threshold voltages, these currents I1$i$ are different.

This distribution of the principal current in the N first transistors TR1$i$ generates for each first transistor, and therefore at the level of the common terminal BGC, a first mean gate source voltage VGSM.

This mean gate source voltage VGSM biases the gate of each second transistor TR2$j$. Of course, this voltage VGSM is greater than the threshold voltage of the transistors.

Each second transistor TR2$j$ is traversed by a current ITR$j$.

Moreover, on account of the current mirror MR, each secondary transistor TRS$j$ delivers a reference current IR$j$ to the corresponding common node NC$j$.

This reference current IR$j$, also dubbed hereinafter as base current, is identical for each transistor TRS$j$ and corresponds to 1/Nth of the principal current IP.

It will also be noted that the current IP corresponds to the sum of the N currents I$ii$ passing through the N first transistors TR1$i$.

Consequently, 1/Nth of this current IP represents the mean (i.e., average) of the currents passing through the N first transistors TR1$i$.

Having regard to the random distribution of the threshold voltages of the set of transistors TR1$i$ and TR2$j$, the current passing through a second transistor TR2$k$ or TR2$j$ can be situated, as illustrated in FIG. 6, on one side or the other of the reference current IR$j$.

Thus, if for example the transistor TR2k draws the current ITRk whose level is less than the level of the reference current IRj, the corresponding common node NCk rises to a voltage greater than Vdd/2.

If, on the other hand, the current ITRj passing through the second transistor TR2j has a level which is greater than the level of the reference current IRj, then the voltage of the corresponding common node NCj drops below Vdd/2.

Thus, as illustrated in FIG. 7, the comparator CMPj verifies whether the current ITRj passing through the corresponding second transistor TR2j is or is not less than the reference current IRj which is the same for all the secondary transistors TRS1-TRSK.

If such is the case, then the output signal SSj delivered to the output node NSj has a voltage of V1 volts while in the converse case it has a zero voltage.

In the first case, the value of the corresponding bit bj of the code delivered by the physically unclonable function is equal to 1 while it is equal to 0 in the second case.

Figure 8:
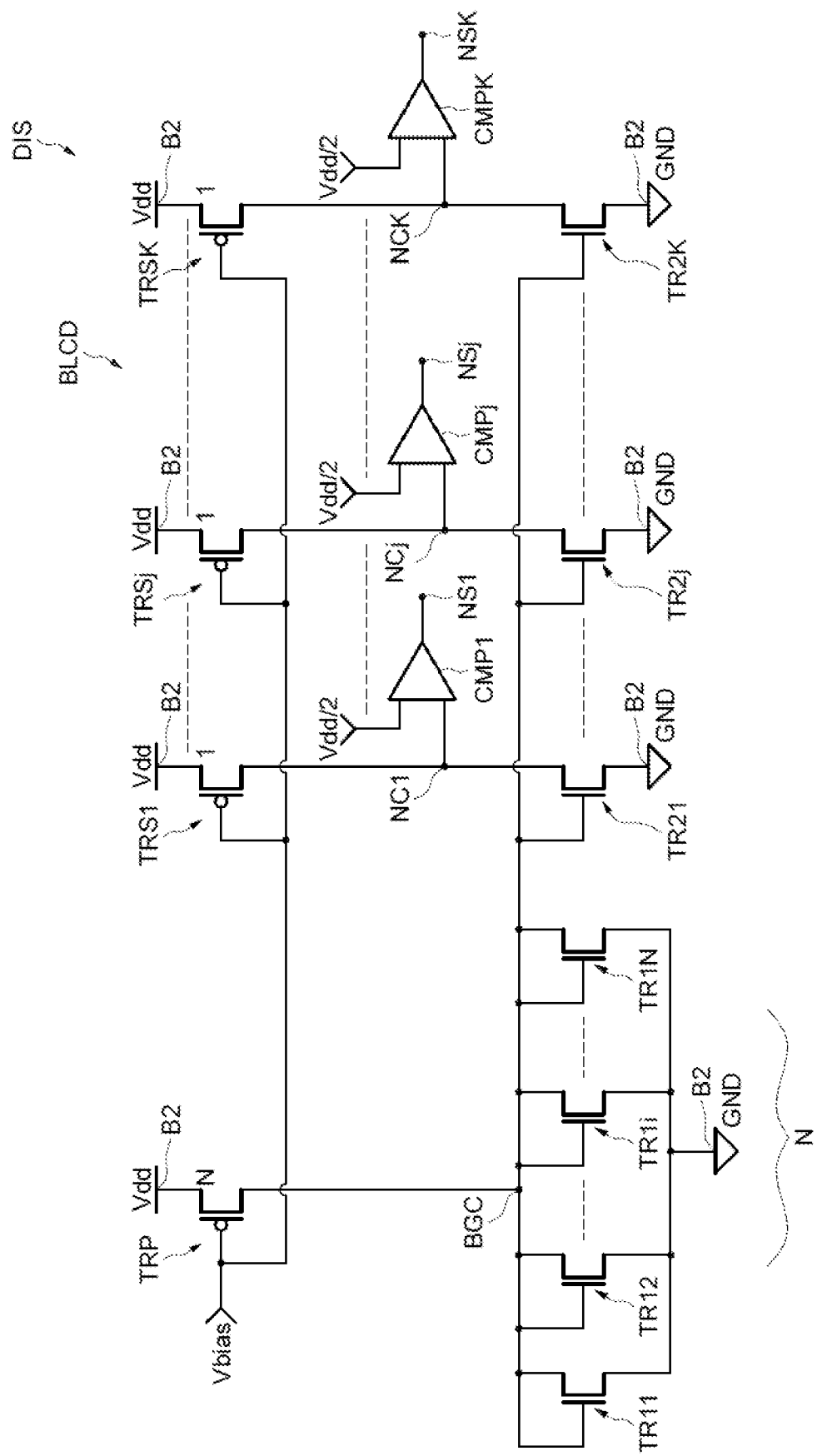

The embodiment of the device DIS illustrated in FIG. 8 differs from that illustrated in FIG. 2 in the sense that the current mirror of the device of FIG. 2 is replaced with a current-divider circuit BLCD.

This current-divider circuit includes the principal transistor TRP and auxiliary transistors TRS1-TRSK in a size ratio of N for 1. However, in this circuit BLCD, the gates of the pMOS transistors TRP and TRS1-TRSK are all linked and intended to be biased by a bias voltage Vbias which can typically be equal to Vdd less a fixed voltage value, for example 1 volt.

Figure 9:
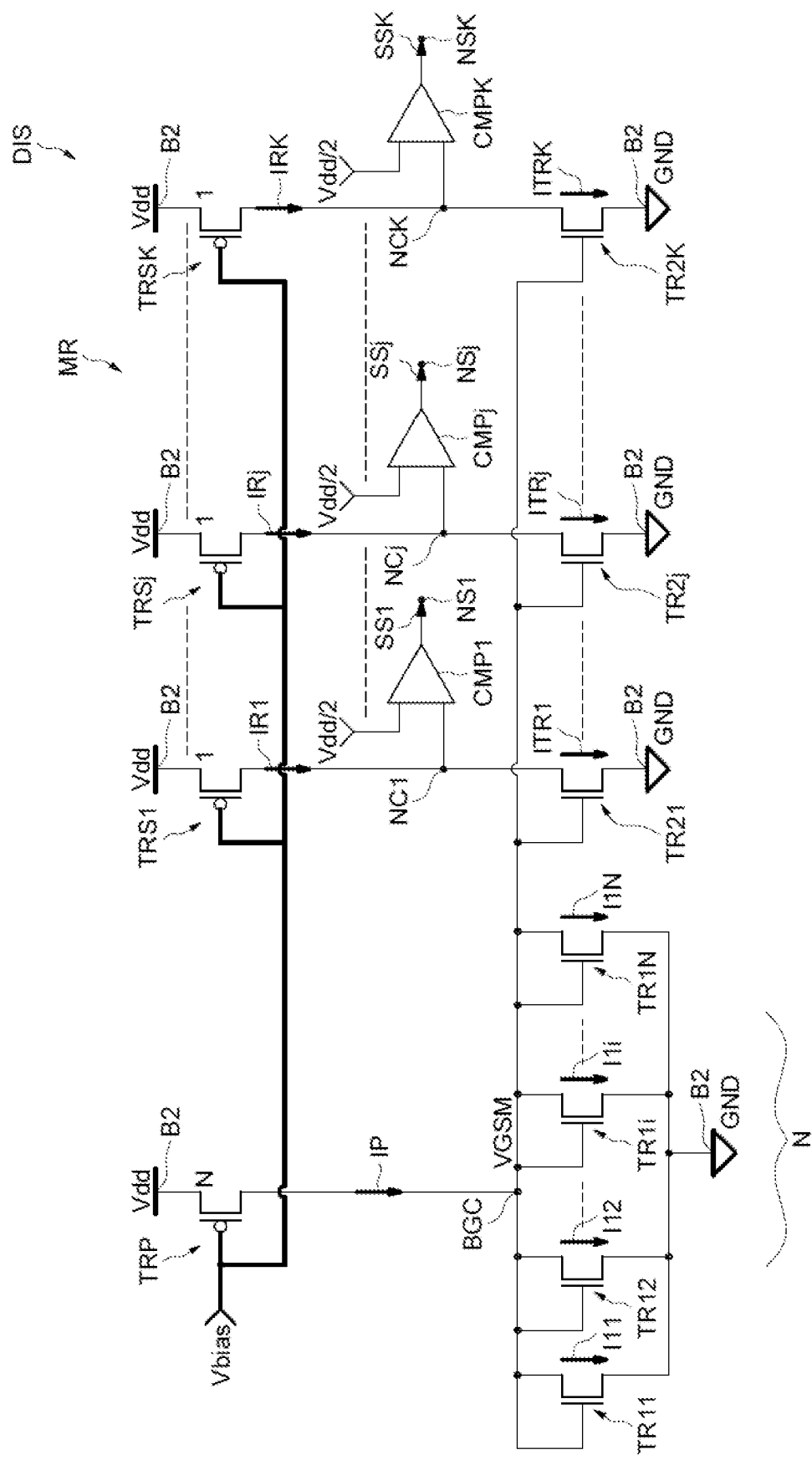

Reference is now made to FIG. 9 to describe the operation of the device of FIG. 8.

This operation is essentially similar to that which was described with reference to FIG. 5.

More precisely, when the device is powered by the power supply voltage Vdd and the gates of the transistors of the current-divider circuit are biased by the voltage Vbias, the principal transistor TRP imposes the principal current IP which is distributed in the N first transistors TR11-TR1N. The first mean (i.e., average) gate source voltage VGSM biases the gates of the second transistors TR21-TR2K.

The latter are traversed by currents ITRj and the reference current IRj delivered to each common node NCj is identical and equal to the base current corresponding here again to 1/Nth of the principal current IP.

However, in contradistinction to the previous embodiment, this embodiment makes it possible, on account of the bias voltage Vbias, to adjust the value of the current IP and therefore to decrease the consumption of the device.

Moreover, the value of the current IP makes it possible to also adjust the value of the first mean gate source voltage VGSM which, when it approaches the threshold voltage of the transistors TR21-TR2K, makes it possible to widen the distribution of values of the individual currents ITRj passing through the second transistors TR2j.

This gives an additional degree of variability for the physically unclonable function device DIS.

The determination of the value of the bits of the digital code delivered by the device DIS of FIG. 8 is analogous to what was explained with reference to FIG. 7.

Figure 10:
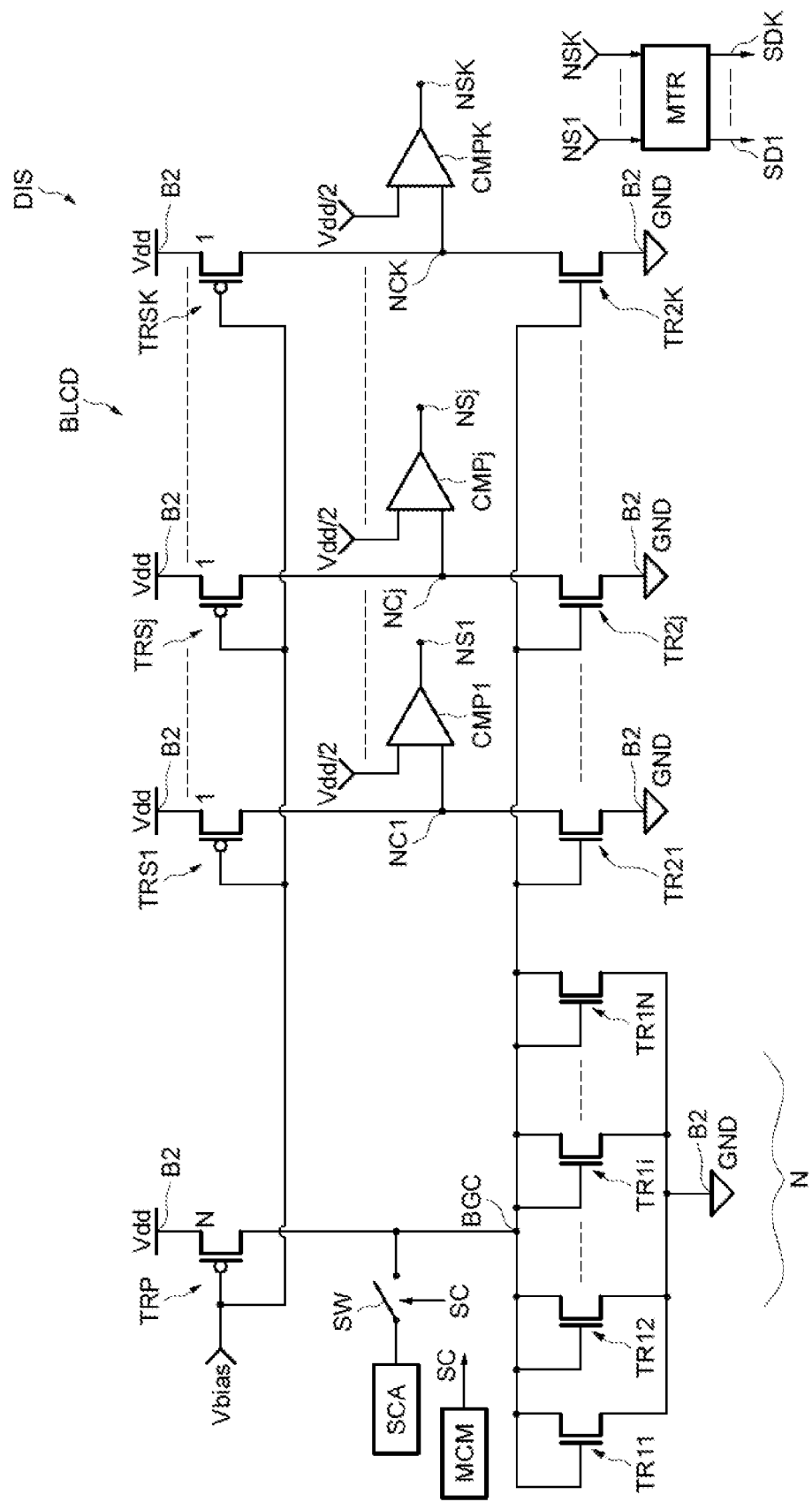

Reference is now made more particularly to FIG. 10 to illustrate another embodiment of the physically unclonable function device DIS.

This embodiment differs from that of FIG. 8 through the fact that the first coupling link furthermore includes an auxiliary current source SCA controllable by a control signal SC delivered by control circuit MCM and capable of delivering an auxiliary current or the opposite auxiliary current on the common terminal BGC.

When the auxiliary current source SCA is deactivated (corresponding schematically to the switch SW open) the first coupling link is then in a first state which corresponds to that illustrated in FIG. 8.

Figure 11:
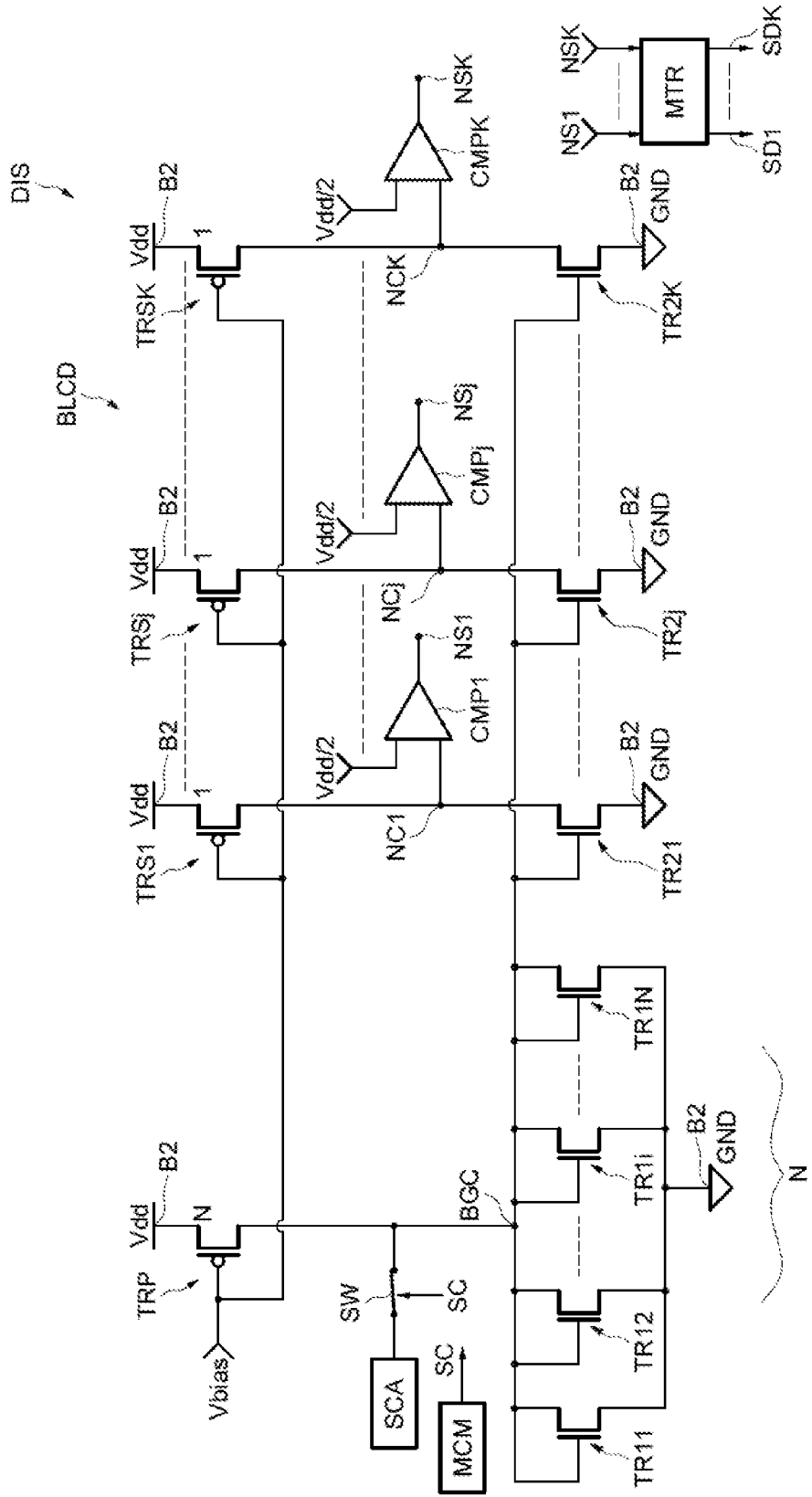

On the other hand, when the auxiliary current source SCA is activated (corresponding to the switch SW closed), the first coupling link is then in a second state as illustrated in FIG. 11.

This embodiment of FIGS. 10 and 11 makes it possible to detect bits of the digital code delivered by the device DIS whose values might not be stable and repeatable.

Figure 12:
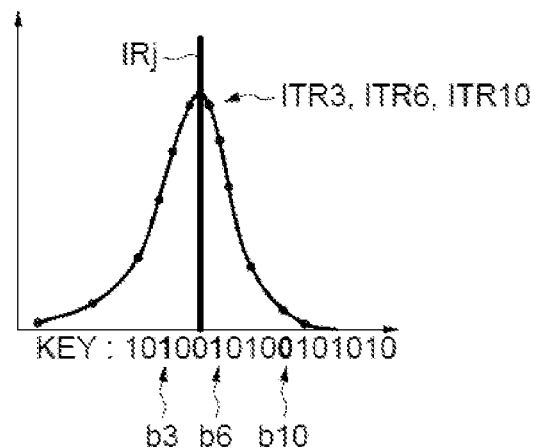

Indeed, as illustrated in FIG. 12, when the device DIS is in its first state (FIG. 10) or when it is not equipped with any auxiliary current source SCA at all, it may very well happen that for certain second transistors, the currents ITRj passing through them have levels close to the level of the reference current IRj.

In this case, the characteristics of the comparator CMPj may lead to comparisons giving unstable or non-repeatable values from one power-up to another.

This is the case for example as illustrated in FIG. 12, for the bits b3, b6 and b10 for which the currents ITR3, ITR6 and ITR10 passing through the second transistors TR23, TR26 and TR210 have values very close to the value of the reference current IRj.

As illustrated in FIG. 12, theoretically, the logical values of these bits b3, b6 and b10 equal 1, 1, 0 respectively.

However, these logical values may toggle from one power-up to another for example because of the comparison instability.

The embodiment of FIGS. 10 and 11 envisaging the use of an auxiliary current source SCA makes it possible to detect these bits and to take a decision as regards the management of their value.

This can be performed advantageously during the first power-up of the device DIS.

Figure 13:
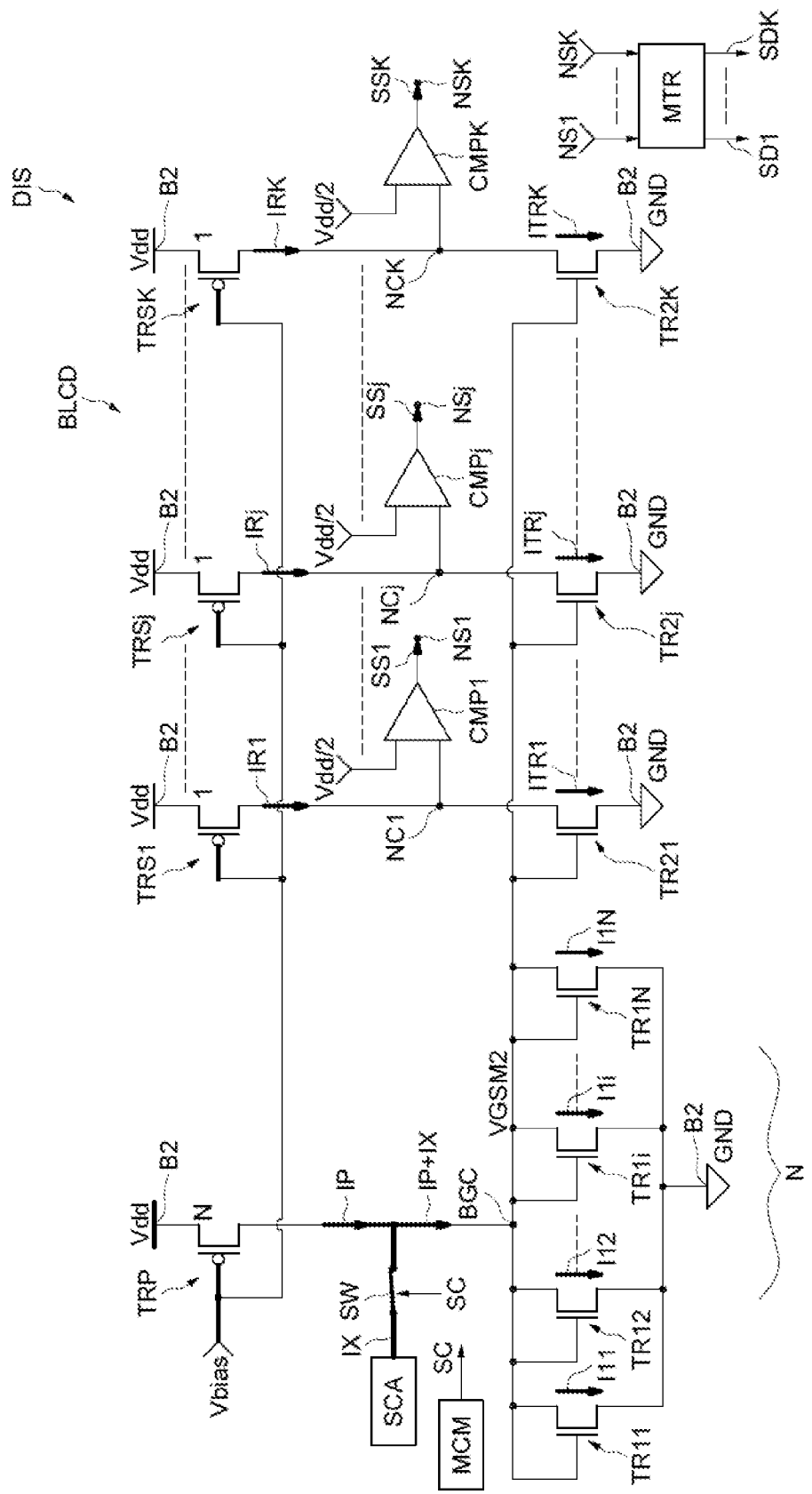

In this regard, as illustrated in FIG. 13, during this first power-up, the auxiliary current source SCA is controlled so as to deliver an auxiliary current IX which is superimposed on the principal current IP, this superposed current being distributed in the N first transistors TR11-TR1N.

This generates a second mean gate source voltage VGSM2 which biases the gates of the second transistors TR21-TR2K.

On the other hand, the value of the reference current IRj remains equal to the value of the base current corresponding to 1N/th of the principal current IP.

Figure 15:
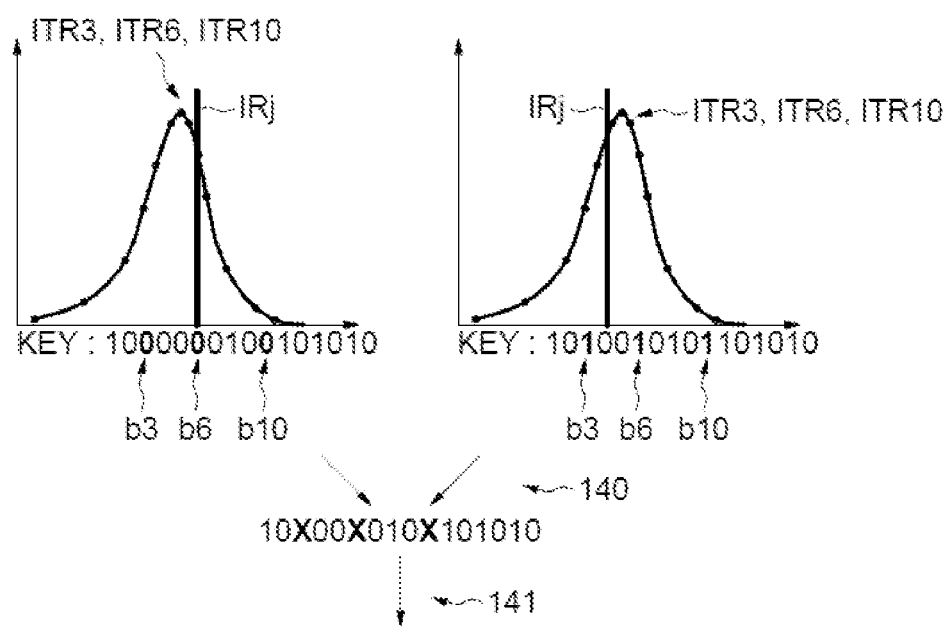

But, because of this current shift at the level of the principal current IP, the distribution of the currents passing through the second transistors TR21-TR2K is shifted to the left of the value of the reference current IRj as illustrated in the upper left part of FIG. 15.

Therefore, the logical values of the bits b3, b6 and b10 are consequently equal to 0.

Figure 14:
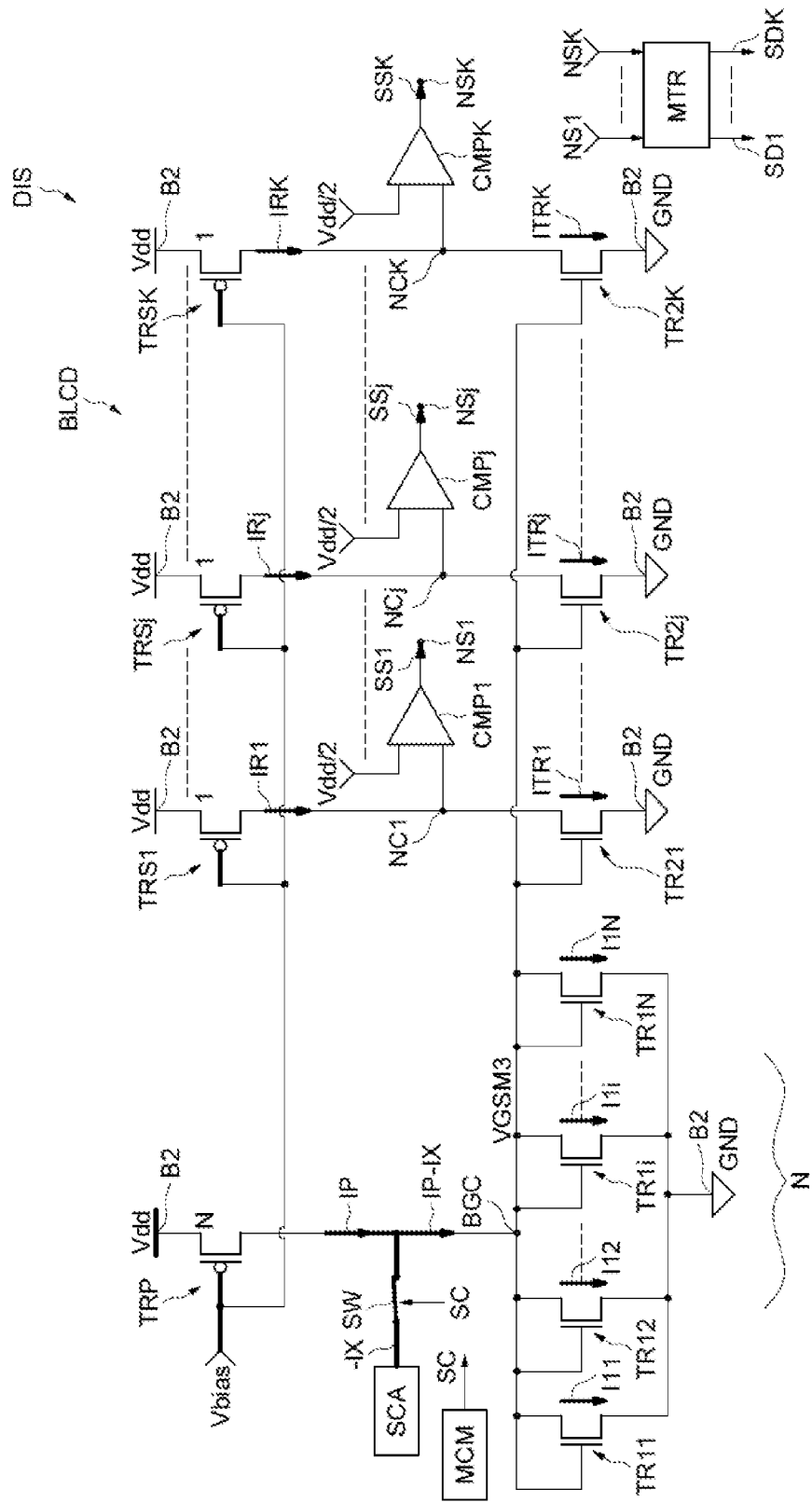

Thereafter, a shift at the level of the principal current IP is undertaken in the opposite direction, as illustrated in FIG. 14.

Stated otherwise, the auxiliary current source SCA is then controlled so as to deliver the opposite-IX of the auxiliary current IX.

Therefore, the superposed current which is distributed in the N first transistors TR11-TR1N is equal to IP-IX generating a mean (i.e., average) gate source voltage VGSM3 at the common terminal BGC.

Here again, the level of the reference current IRj remains equal to the base current corresponding to 1/Nth of the principal current IP.

However, as illustrated in the upper right part of FIG. 15, this time the distribution of the individual currents ITRj passing through the second transistors TR2j is shifted to the right of the reference current IRj therefore conferring the logical values 1 on the bits b3, b6 and b10.

Processor MTR (FIGS. 10, 11, 13 and 14) then compares the digital code KEY delivered to the output nodes NSj of the device DIS, bitwise, so as to tag the bits whose logical values have changed between a rightward shift and a leftward shift of the distribution.

The processor MTR performs, as illustrated in FIG. 15, this comparison in step 140 and deliver comparison signals SDj (FIGS. 10, 11, 13 and 14) representative of the results of this comparison.

In this regard, the processor MTR can include logic circuits.

In this example, the bits b3, b6 and b10 have been tagged and are marked by crosses.

Next, the processor MTR makes a decision as regards the management of these unstable bits (step 141 FIG. 15).

In this regard, three solutions are for example possible.

A first solution consists in disregarding these unstable bits in the digital code delivered by the device DIS.

In this case, the digital code KEY1 does not include bits b3, b6 and b10.

Another solution consists in conferring an arbitrary logical value on these bits b3, b6 and b10.

Thus, if the logical value 1 is conferred on these unstable bits, the digital code KEY2 is obtained while if the logical value 0 is conferred on these bits, the digital code KEY3 is obtained.

It is also possible to choose as solution, an arbitrary combination of the previous three solutions.

And, this decision is stored in the device DIS.

On completion of this decision taking, the device DIS can then be placed back in its first state corresponding to that illustrated in FIG. 10 and the decision taken as regards the unstable bit remains stored and valid thereafter.

It is valid during all the later power-ups for which it is no longer necessary to place the device DIS in its second state in order to undertake shifts of current.

A digital code which is perfectly repeatable from one power-up to another is then obtained.

Figure 16:
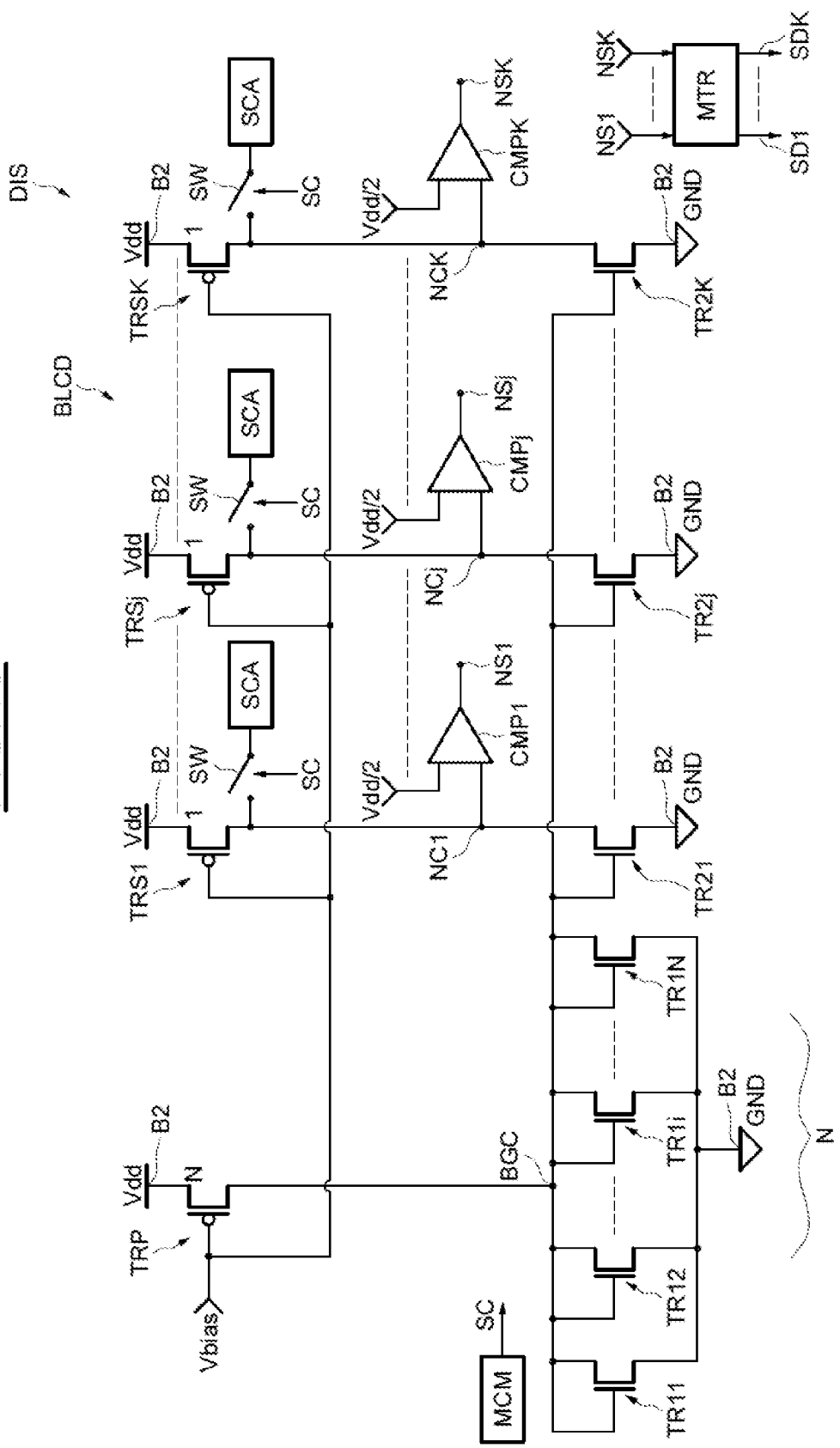

Whilst in the embodiment of FIG. 10, and of Figure ii, the voltage source SCA is connected at the level of the common terminal BGC, this being particularly simple to achieve, it would however be possible as a variant to connect an auxiliary voltage source SCA at the level of the drain of each secondary pMOS transistor TRSj (FIG. 16).

And, in this case, this time it would be the reference current which would be shifted so as to, the device DIS then being placed in a third state, successively deliver a reference current equal to the base current IRj increased by the auxiliary current IX or else decreased by this auxiliary current IX.

And the result of the detection of the unstable bits would then be analogous to what was described hereinabove.

Of course, although a delivery of an auxiliary current IX and then of its opposite by the auxiliary current source has just been described in the second or the third state, it would be entirely conceivable to deliver firstly the opposite of the auxiliary current and then the auxiliary current.

The digital code generated by the device DIS is independent of the temperature conditions and aging conditions since all the transistors of this device DIS are subjected to the same temperature variations and to the same aging and since any way, the bias of the gates of the secondary transistors and the generation of the reference current result from an average of the currents traversing the various transistors exhibiting a randomly modified threshold voltage.

Figure 17:
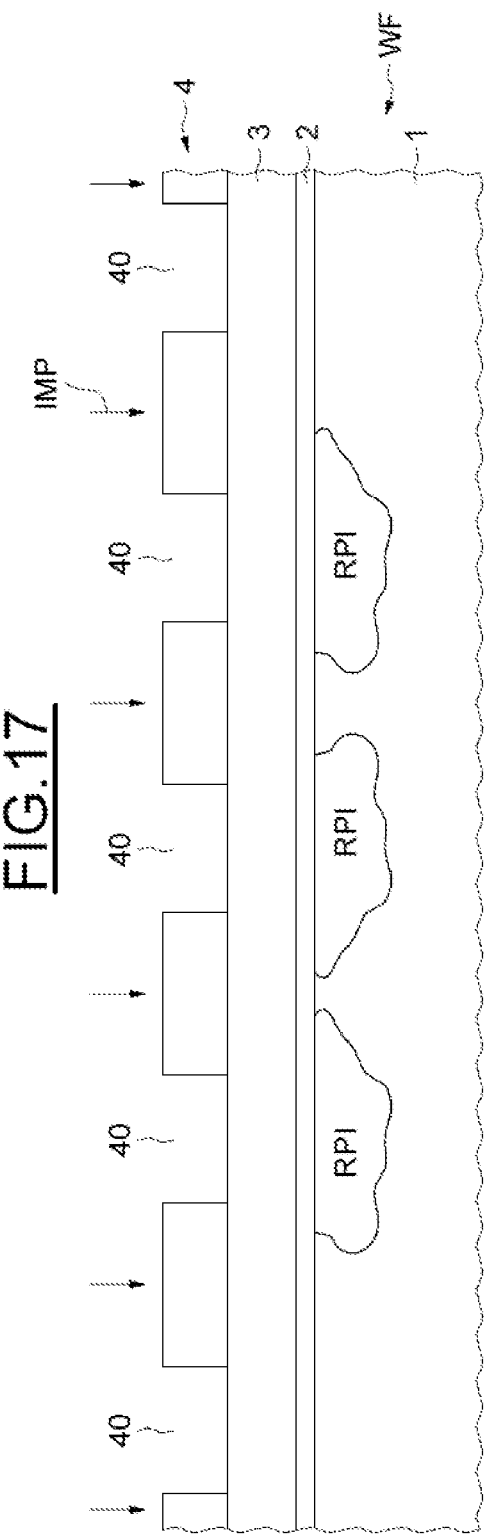
Figure 18:
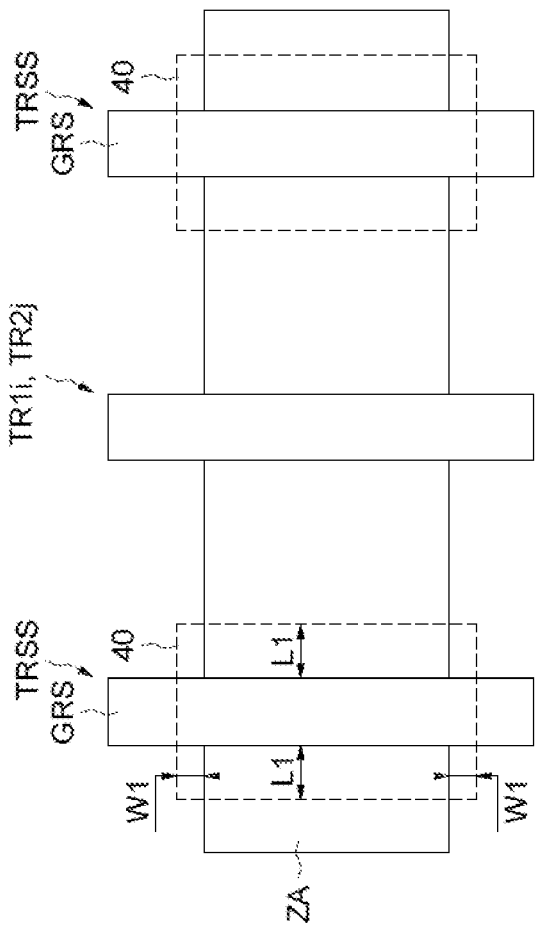
Figure 19:
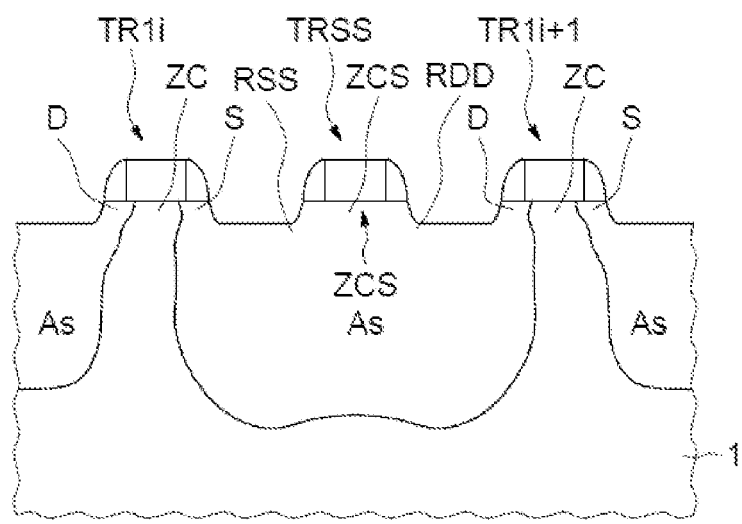

Reference is now made more particularly to FIGS. 17 to 19 to illustrate a nonlimiting example of a method of production of a device DIS making it possible to obtain a random distribution of threshold voltages in a simple manner.

As illustrated in FIG. 17, the production method includes after formation on the substrate of the whole of the semiconductor wafer WF of a dielectric layer 2, for example silicon dioxide, the formation of a polysilicon layer (polycrystalline silicon) 3.

The method also includes a formation on this polysilicon layer 3 of a mask 4, for example a resin mask, including openings 40.

As illustrated in FIG. 18, these openings 40 are situated alongside the future first transistors TR1i and the future second transistors TR2i.

An initial implantation IMP is then undertaken, in the substrate of the wafer WF, of dopants having the same type of conductivity as the source region and drain region of the set of future MOS first transistors and second transistors.

Thus, if the first transistors and the second transistors are nMOS transistors, it is possible to undertake for example an implantation of arsenic or phosphorus while if the first and the second MOS transistors are pMOS transistors, it is possible to undertake a boron implantation.

The regions of the substrate 1 of the semiconductor wafer that are situated under a region of the resin-protected polysilicon layer 3 do not directly undergo the implantation of dopants IMP.

On the other hand, on account of the presence of the crystalline structure of the polysilicon, of the drain boundaries and of the orientation of the grains, the implantation of dopants IMP is manifested by a lateral implantation tilted typically by an angle of less than 45°, in the substrate regions situated alongside the openings 40.

Therefore, as illustrated in FIG. 17, initial implanted regions RPI are obtained, overhanging on each side of the uncovered parts of the polysilicon layer 3.

The mask 4 is then withdrawn and the MOS transistors are formed in a conventional and known manner, alongside the said uncovered polysilicon parts in such a way that, as illustrated in FIG. 18, each first or second transistor TR1i has in the substrate an active zone incorporating a part of an initial implanted region.

In fact, as seen in FIG. 19, on account of the initial implantation IMP, for example with arsenic, the channel region ZC of the MOS transistor TR1i for example, has received a part of the initial arsenic implants and its length has consequently been modified with respect to a standard transistor, this having led to a modification of its threshold voltage.

And, as during the formation of the polysilicon layer, the size of the grains, their location, their orientation and the grain boundaries have been obtained in a random manner, the initial implantation of dopants through the polysilicon layer has randomly modified the threshold voltages of all the first and second transistors.

This is seen for example in FIG. 19 in which the channel zone ZC of the first neighbor transistor TR1i+1 is different from the channel zone of the first transistor TR1i.

A random distribution of the threshold voltages of these transistors has therefore been ensured here.

Moreover, during the conventional fabrication of the MOS transistors, the parts of the polysilicon layer 3 which were exposed to the implantation through the openings 40 have led to the formation of additional transistor gates TRSS situated between two transistors with modified threshold voltage. And, having regard to this initial implantation, these additional transistors have become always-on transistors since their channel region ZCS contains dopants of the same type as those of their source region RSS and drain region RDD.

And, their presence renders detectability of the presence of the physically unclonable function within the integrated circuit more difficult since viewed from above, it is not possible to know whether the transistor TRSS is a conventional transistor or an always-on "dummy" transistor.

Of course, whilst it would be possible to randomly modify the threshold voltage of an MOS transistor by placing an opening on only one side of this future MOS transistor, it is preferable to straddle the MOS transistor by two additional transistors resulting from a tilted implantation on each side of this first or of these second MOS transistors. This makes it possible to further widen the random distribution of threshold voltages.

By way of indication, as illustrated in FIG. 18, the size of the opening of the vignettes is compatible with the height of the polysilicon layer so as to obtain this tilted implantation. By way of indication, in 45 nanometer technology, and with grains that may have lengths varying from 50 to 80 nanometers, it is possible to choose an opening 40 overhanging the active zone ZA of the transistors by a width W1 of the order of 70 nanometers and overhanging the future gate GRS of the additional transistor TRS by a length L1 of 70 nanometers. It is possible to choose implantation energies varying from 30 keV to 110 keV for arsenic or phosphorus (for example 50 keV) or from 10 keV to 50 keV for boron (for example 20 keV).

The disclosure is not limited to the modes of implementation and embodiments which have just been described but embraces all variants thereof.

Thus the first transistors TR1*i* and the second transistors TR2*j* may be pMOS transistors.

The transistors TRP and TRSj of the current mirror MP or of the current-divider circuit BLCD may be conventional transistors or else transistors with randomly modified threshold voltage.

The transistors TR1*i* and TR2*j* may advantageously be grouped together within the integrated circuit.

What is claimed is:

1. An integrated circuit, comprising:
 a domain comprising a physically unclonable function device, the physically unclonable function device comprising a set of MOS transistors exhibiting a random distribution of respective threshold voltages;
 a first coupling link coupling a group of N first transistors of the set of MOS transistors and a second transistor of the set of MOS transistors via a common node;
 a second coupling link between the common node and an output node of the physically unclonable function device, wherein the first coupling link is configured to:
  generate a principal current and distribute the principal current in the group of N first transistors when the domain is powered and when the first coupling link is in a first state so as to generate for each first transistor of the group of N first transistors a first mean gate source voltage;
  bias a gate of the second transistor by the first mean gate source voltage; and
  deliver a reference current to the common node, wherein the reference current is equal to a base current corresponding to 1/Nth of the principal current, and wherein the second coupling link is configured to deliver an output signal to the output node, the output signal being dependent on a comparison between the reference current and a current passing through the second transistor.

2. The integrated circuit according to claim 1, wherein the first coupling link is further configured to:
 generate a first superposed current resulting from a superposition of the principal current and of an auxiliary current when the domain is powered and when the first coupling link is in a second state;
 generate a second superposed current resulting from a superposition of the principal current and of an opposite auxiliary current when the domain is powered and when the first coupling link is in a second state, wherein generating the first superposed current and the second superposed current distributes the first superposed current and the second superposed current in the group of N first transistors so as to generate a second mean gate source voltage for each of the first transistor of the group of N first transistors;
 bias the gate of the second transistor by the second mean gate source voltage; and
 deliver the reference current, equal to the base current, to the common node.

3. The integrated circuit according to claim 2, wherein the first coupling link furthermore comprises a controllable auxiliary current source configured to generate the auxiliary current or the opposite auxiliary current.

4. The integrated circuit according to claim 3, wherein the controllable auxiliary current source is coupled to gates of the group of N first transistors.

5. The integrated circuit according to claim 1, wherein the first coupling link is further configured to:
 generate the principal current when the domain is powered and when the first coupling link is in a third state;
 distribute the principal current in the group of N first transistors so as to generate the first mean gate source voltage for each of the first transistor of the group of N first transistors;
 bias the gate of the second transistor by the first mean gate source voltage; and
 deliver the reference current to the common node, the reference current comprising a first current resulting from a superposition of the base current and of an auxiliary current, the reference current further comprising a second current resulting from a superposition of the base current and of an opposite auxiliary current.

6. The integrated circuit according to claim 5, wherein the physically unclonable function device comprises:
 a control circuit configured to place the first coupling link in a second state or a third state; and
 a processor configured to analyze the output signal associated with the auxiliary current and the output signal associated with the opposite auxiliary current, and in case of manage a bit of a digital code in response to a disagreement between logical values of the bit of the digital code that are respectively associated the output signal associated with the auxiliary current and the output signal associated with the opposite auxiliary current.

7. The integrated circuit according to claim 6, wherein the control circuit is configured to:
place the first coupling link in the second state or the third state during a first power-up of the domain; and
place the first coupling link in the first state during the first power-up subsequent to the first coupling link being in the second state or the third state, and during a later power-up, wherein managing the bit of the digital code during the first power-up is valid for the later power-up.

8. The integrated circuit according to claim 6, wherein the processor is configured to manage the bit of the digital code by disregarding the bit of the digital code, fixing an arbitrary logical value for the bit of the digital code, or a combination thereof.

9. The integrated circuit according to claim 1, wherein the first coupling link is configured to:
mount each of the first transistor of the group of N first transistors according to a diode arrangement;
connect the group of N first transistors in parallel; and
connect gates of the group of N first transistors to the gate of the second transistor, wherein the first coupling link comprises a current-divider circuit connected between the gates of the group of N first transistors and the common node when the first coupling link is in the first state.

10. The integrated circuit according to claim 9, wherein the current-divider circuit comprises a current mirror connected between the group of N first transistors and the common node.

11. The integrated circuit according to claim 9, wherein the current-divider circuit comprises a principal transistor connected to the gates of the group of N first transistors, the principal transistor being configured to impose the principal current and to be biased by a bias voltage, wherein the current-divider circuit further comprises a secondary transistor connected to the common node, wherein a gate of the second transistor is connected to a gate of the principal transistor and configured to provide the base current to the common node.

12. The integrated circuit according to claim 1, wherein the first coupling link is further configured to:
generate the principal current when the domain is powered and when the first coupling link is in a third state;
distribute the principal current in the group of N first transistors so as to generate the first mean gate source voltage for each of the first transistor of the group of N first transistors;
bias the gate of the second transistor by the first mean gate source voltage; and
deliver the reference current to the common node, the reference current comprising a first current resulting from a superposition of the base current and of an auxiliary current, the reference current further comprising a second current resulting from a superposition of the base current and of an opposite auxiliary current.

13. An integrated circuit comprising:
a domain comprising a physically unclonable function device, the physically unclonable function device comprising a set of MOS transistors exhibiting a random distribution of respective threshold voltages;
a first coupling link coupling a group of N first transistors of the set of MOS transistors and a second transistor of the set of MOS transistors via a common node;
a second coupling link between the common node and an output node of the physically unclonable function device, wherein the first coupling link is configured to:
generate a principal current and distribute the principal current in the group of N first transistors when the domain is powered and when the first coupling link is in a first state so as to generate for each first transistor of the group of N first transistors a first mean gate source voltage;
bias a gate of the second transistor by the first mean gate source voltage; and
deliver a reference current to the common node, wherein the reference current is equal to a base current corresponding to i/Nth of the principal current, and wherein the second coupling link is configured to deliver an output signal to the output node, the output signal being dependent on a comparison between the reference current and a current passing through the second transistor, wherein the domain comprises an additional transistor alongside each MOS transistor of the set of MOS transistors, wherein a channel region of the set of MOS transistors comprises dopants of a same type of conductivity as the dopants of a source region and a drain region of the additional transistor.

14. The integrated circuit according to claim 13, wherein each MOS transistor of the set of MOS transistors is flanked by two additional transistors.

15. The integrated circuit according to claim 1, wherein N is greater than 10.

16. The integrated circuit according to claim 13, wherein the first coupling link is further configured to:
generate a first superposed current resulting from a superposition of the principal current and of an auxiliary current when the domain is powered and when the first coupling link is in a second state;
generate a second superposed current resulting from a superposition of the principal current and of an opposite auxiliary current when the domain is powered and when the first coupling link is in a second state, wherein generating the first superposed current and the second superposed current distributes the first superposed current and the second superposed current in the group of N first transistors so as to generate a second mean gate source voltage for each of the first transistor of the group of N first transistors;
bias the gate of the second transistor by the second mean gate source voltage; and
deliver the reference current, equal to the base current, to the common node.

17. The integrated circuit according to claim 13, wherein the first coupling link is configured to:
mount each of the first transistor of the group of N first transistors according to a diode arrangement;
connect the group of N first transistors in parallel; and
connect gates of the group of N first transistors to the gate of the second transistor, wherein the first coupling link comprises a current-divider circuit connected between the gates of the group of N first transistors and the common node when the first coupling link is in the first state.

18. An integrated circuit, comprising:
a domain comprising a physically unclonable function device, the physically unclonable function device comprising a set of MOS transistors exhibiting a random distribution of respective threshold voltages;
a current divider circuit comprising a principal transistor and K secondary transistors;
N first transistors of the set of MOS transistors coupled to the principal transistor through a common node;

K second transistors of the set of MOS transistors, each of the K second transistors being coupled to a drain of the K secondary transistors, wherein gates of the N first transistors and the K second transistors are coupled to the common node; and K comparators, each of the K comparators having a first input coupled to an intermediate node between drains of the K secondary transistors and the K second transistors and a second input coupled to a reference voltage and an output node configured to output a comparison between a first potential at the first input and a second potential at the second input.

19. The integrated circuit according to claim 18, wherein a gate of the principal transistor and gates of the K secondary transistors are coupled to a bias voltage node.

20. The integrated circuit according to claim 18, further comprising:
   a control circuit configured to generate a control signal;
   an auxiliary current source configured to generate an auxiliary current; and
   a switch coupling the auxiliary current source to the common node and configured to be activated by the control signal to be enabled or disabled.

21. The integrated circuit according to claim 18, further comprising:
   a control circuit configured to generate a control signal;
   K auxiliary current sources, each of the K auxiliary current sources configured to generate an auxiliary current; and
   K switches, each of the K switches coupling each of the K auxiliary current sources to one of the drains of the K secondary transistors and configured to be activated by the control signal to be enabled or disabled.

22. The integrated circuit according claim 18, wherein the domain comprises an additional transistor alongside each MOS transistor of the set of MOS transistors, wherein a channel region of the set of MOS transistors comprises dopants of a same type of conductivity as the dopants of a source region and a drain region of the additional transistor.

23. The integrated circuit according to claim 22, wherein each MOS transistor of the set of MOS transistors is flanked by two additional transistors.

24. The integrated circuit according to claim 18, wherein N is greater than 10.

* * * * *

UNITED STATES PATENT AND TRADEMARK OFFICE
CERTIFICATE OF CORRECTION

| | | |
|---|---|---|
| PATENT NO. | : 10,833,027 B2 | Page 1 of 1 |
| APPLICATION NO. | : 15/784883 | |
| DATED | : November 10, 2020 | |
| INVENTOR(S) | : Lisart et al. | |

It is certified that error appears in the above-identified patent and that said Letters Patent is hereby corrected as shown below:

In the Claims

In Column 16, Line 11, Claim 13, delete "i/Nth" and insert --1/Nth--.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*